US008229580B2

(12) United States Patent
Ohno

(10) Patent No.: US 8,229,580 B2
(45) Date of Patent: Jul. 24, 2012

(54) ELECTRONIC APPARATUS, CONTROL METHOD OF ELECTRONIC APPARATUS AND POWER SAVING CONTROL DEVICE

(75) Inventor: Katsuya Ohno, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 12/618,572

(22) Filed: Nov. 13, 2009

(65) Prior Publication Data

US 2010/0191350 A1 Jul. 29, 2010

(30) Foreign Application Priority Data

Jan. 28, 2009 (JP) ................................. 2009-016962

(51) Int. Cl.
*G06F 19/00* (2011.01)
(52) U.S. Cl. .......................................... 700/40; 348/790
(58) Field of Classification Search .................... 700/40; 348/790
See application file for complete search history.

(56) References Cited

U.S. PATENT DOCUMENTS

| | | | | |
|---|---|---|---|---|
| 5,278,654 | A | 1/1994 | Yang | |
| 6,738,055 | B1* | 5/2004 | Abe et al. | 345/211 |
| 6,874,094 | B2* | 3/2005 | Parker | 713/310 |
| 7,080,322 | B2* | 7/2006 | Abbott et al. | 715/744 |
| 7,123,139 | B2* | 10/2006 | Sweeney | 340/521 |
| 7,295,197 | B2* | 11/2007 | Abe et al. | 345/211 |
| 7,469,550 | B2* | 12/2008 | Chapman et al. | 62/157 |
| 2006/0208099 | A1* | 9/2006 | Chapman et al. | 236/51 |
| 2006/0285024 | A1* | 12/2006 | Chou et al. | 348/790 |
| 2008/0316371 | A1* | 12/2008 | Hauck | 348/734 |
| 2009/0195349 | A1* | 8/2009 | Frader-Thompson et al. | 340/3.1 |
| 2010/0115259 | A1* | 5/2010 | Elsila et al. | 713/100 |
| 2011/0156911 | A1* | 6/2011 | Caglianone | 340/573.1 |
| 2011/0317078 | A1* | 12/2011 | Johns et al. | 348/730 |

FOREIGN PATENT DOCUMENTS

| | | |
|---|---|---|
| JP | 3-053625 | 3/1991 |
| JP | 5-4679 | 1/1993 |
| JP | 5-233106 | 9/1993 |
| JP | 5-316442 | 11/1993 |
| JP | 06-078246 | 3/1994 |
| JP | 8-272496 | 10/1996 |
| JP | 2001-125556 | 5/2001 |
| JP | 2001-359032 | 12/2001 |
| JP | 2002-262374 | 9/2002 |

(Continued)

OTHER PUBLICATIONS

Japanese Patent Application No. 2009-016962, Notice of Reasons for Rejection, mailed Mar. 23, 2010, (with English Translation).

(Continued)

*Primary Examiner* — Michael D Masinick
(74) *Attorney, Agent, or Firm* — Blakely, Sokoloff, Taylor & Zafman LLP

(57) ABSTRACT

According to one embodiment of the invention, an operation control module 107*p* controls an operation status of an electronic apparatus in response to an operation signal from an operation module. A power saving status setting module 107*a* sets the electronic apparatus into the power saving status when a sensing module 108 does not acquire a preset detection output (user detection). A first power saving status releasing module 107*b* releases the power saving status of electronic apparatus when the sensing module has acquired the preset detection output (user detection). A second power saving status releasing module 107*c* releases the power saving status when the operation signal is input from the operation module in the power saving status.

8 Claims, 4 Drawing Sheets

FOREIGN PATENT DOCUMENTS

| | | |
|---|---|---|
| JP | 2002-325207 | 11/2002 |
| JP | 2003-298977 | 10/2003 |
| JP | 2004-336646 | 11/2004 |
| JP | 2006-253981 | 9/2006 |
| JP | 2007-096462 | 4/2007 |
| JP | 2007-199610 | 8/2007 |
| JP | 2007-214983 | 8/2007 |
| JP | 2007-235855 | 9/2007 |
| JP | 2007-312259 | 11/2007 |
| JP | 2008-085729 | 4/2008 |
| JP | 2008-177778 | 7/2008 |
| JP | 2008-187319 | 8/2008 |
| JP | 2008-211652 | 9/2008 |
| JP | 2008-269831 | 11/2008 |

OTHER PUBLICATIONS

Japanese Patent Application No. 2009-016962, Final Notice of Rejection, mailed Aug. 24, 2010, (with English Translation).

Japanese Patent Application No. 2009-016962, Notice of Reasons for Rejection, mailed Jan. 25, 2011, (with English Translation).

* cited by examiner

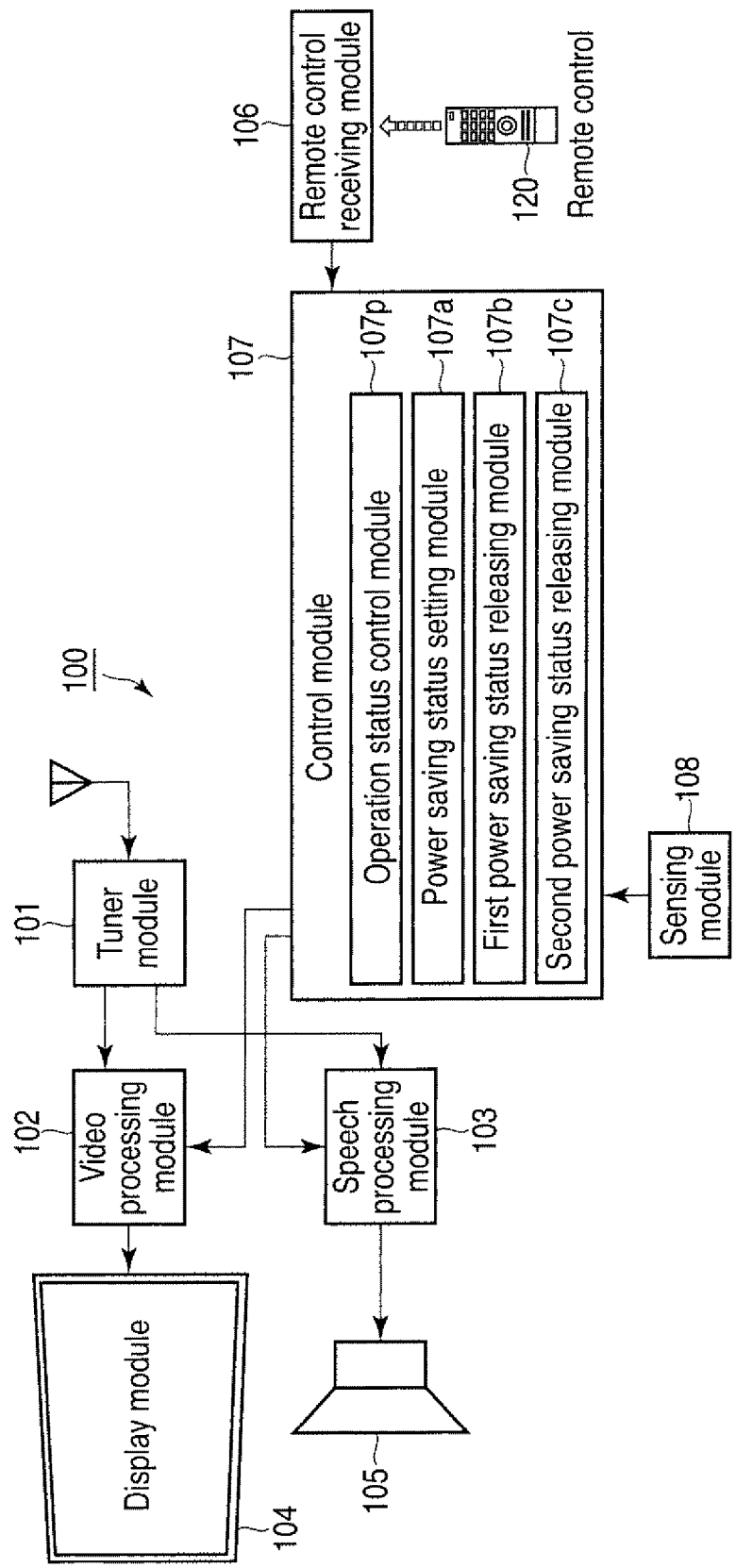
F I G. 2

ELECTRONIC APPARATUS, CONTROL METHOD OF ELECTRONIC APPARATUS AND POWER SAVING CONTROL DEVICE

CROSS-REFERENCE TO RELATED APPLICATIONS

This application is based upon and claims the benefit of priority from Japanese Patent Application No. 2009-016962, filed Jan. 28, 2009, the entire contents of which are incorporated herein by reference.

BACKGROUND

1. Field

One embodiment of the invention relates to an electronic apparatus, a control method of the electronic apparatus and a power saving control device thereof.

2. Description of the Related Art

A power saving measure is taken in an electronic apparatus using electric power. Further, a technique for taking the power saving measure in a video display apparatus is known (for example, Jpn. UM. Appln. KOKAI Publication No. H5-4679 and Jpn. Pat. Appln. KOKAI Publication No. 2001-359032).

In Jpn. UM. Appln. KOKAI Publication No. H5-4679, it is disclosed that a video display apparatus has a human body sensor. If it is detected by the human body sensor that a human comes closer to the video display apparatus, the power source of the video display apparatus is turned on and if a human body is not detected, the power source of the video display apparatus is turned off.

In Jpn. Pat. Appln. KOKAI Publication No. 2001-359032, it is disclosed that a sensor that detects the presence of a user who exists in the neighborhood is provided on a remote control. When the sensor detects that the user is not present, it controls the power saving status step by step according to the length of an absence time of the user.

When the length of the absence time exceeds three minutes, the head of a hard disk device is moved back to a retract position and when a time of five minutes or longer has elapsed, the motor of the hard disk device is stopped.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a diagram showing the configuration blocks of respective portions of the video display apparatus of FIG. 1.

DETAILED DESCRIPTION

Various embodiments according to the invention will be described herein with reference to the accompanying drawings.

In one embodiment of this invention, the reliability of a device is ensured by preventing the user from erroneously recognizing and erroneously operating a device set in a power saving operation status.

According to one aspect of this invention, an electronic apparatus includes an operation status control module configured to control an operation status of the electronic apparatus in response to an operation signal from an operation module; a sensing module configured to detect a specified object in a neighborhood; and a control module configured to selectively set the electronic apparatus into one of a power saving status and a power saving-released status according to whether the sensing module detects the object or does not detect the object, and release the power saving status when an operation signal is input even in the object being not detected and in the power saving status.

The electronic apparatus set in the power saving status may be erroneously recognized in some cases by the user, as if the power source of the electronic apparatus is set in the off status, for example. In such a case, if the user operates a power source button of an operation module, for example, a remote control, the electronic apparatus is set into substantially a power source off status and the user may erroneously recognize that the electronic apparatus becomes faulty. However, according to the solving means described in one aspect of this invention, the problem of erroneous recognition can be solved. Further, even if the detection function of the sensing module deteriorates, the power saving status can be restored by operating the operation module.

Figure 1:
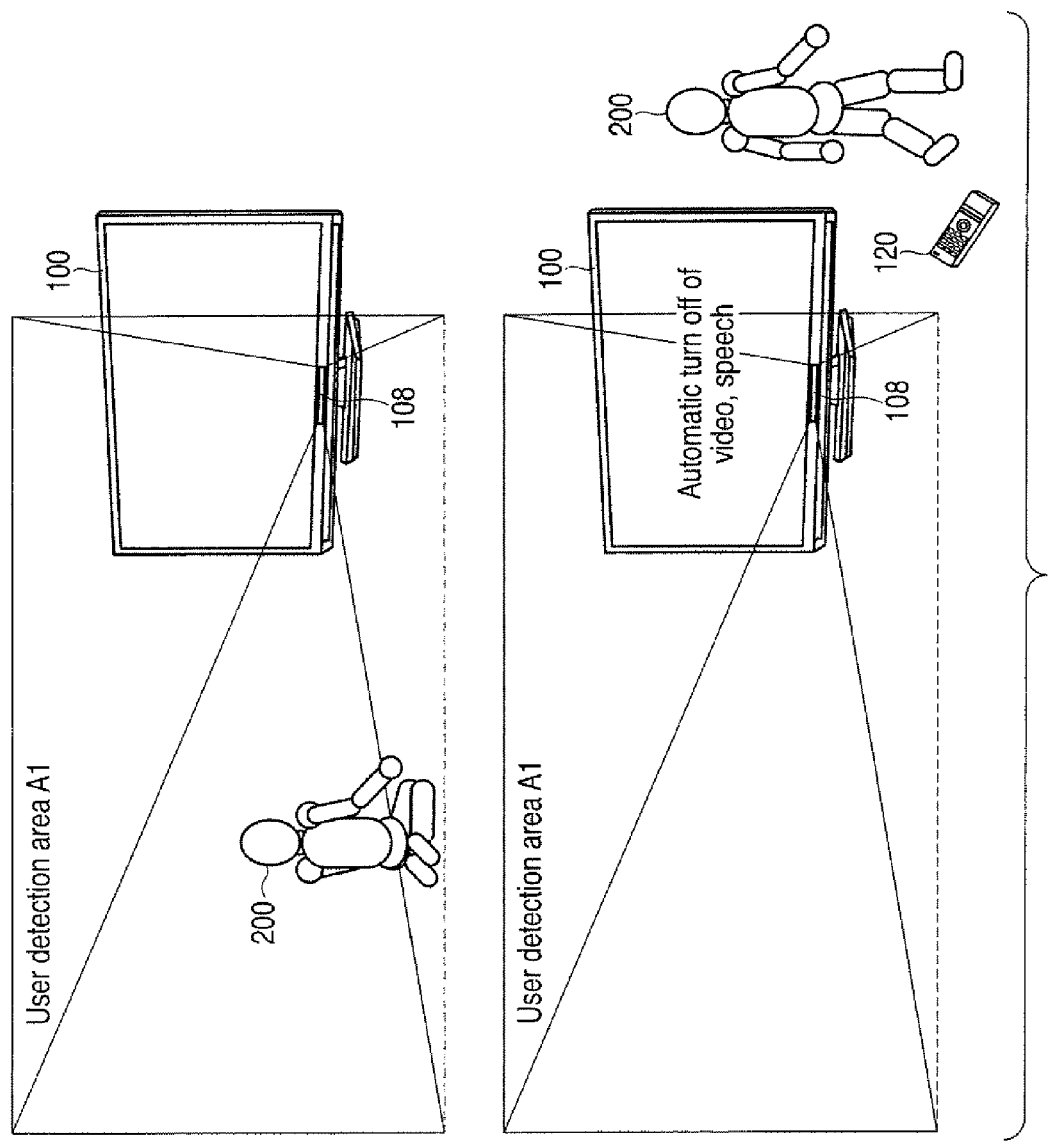
FIG. 1A, FIG. 1B are conceptual views of a video display apparatus to which this invention is applied.

Next, one embodiment of this invention is specifically explained in detail. First, conceptual views indicating that an electronic apparatus to which this invention is applied is a video display apparatus are shown in FIG. 1A, FIG. 1B.

A video display apparatus 100 includes a sensing module 108 that detects the presence or absence of a user 200. As shown in FIG. 1A, when the user 200 exists in a detection area A1 of the sensing module 108, the video display apparatus 100 set in the automatic operative status releases the power saving status and is operated in the normal operation status. However, as shown in FIG. 1B, when the user 200 leaves the detection area A1 of the sensing module 108 and a preset period of time (for example, two to five minutes) has elapsed, the video display apparatus 100 is set into the power saving status.

The video display apparatus 100 set into the power saving status is set into the video and audio output interruption status. As a result, the display module of the video display apparatus 100 is set into a dark status and a speech sound is set into a soundless status. If the video output interruption status is set, the power supply of the backlight of a liquid crystal panel is turned off when the display module is formed of the liquid crystal panel.

FIG. 2 shows an example of the configuration of the video display apparatus 100. The video display apparatus 100 includes a tuner module 101 that receives broadcast waves, a video processing module 102 that processes a video image and a speech processing module 103 that processes a speech sound. An output of the video processing module 102 is supplied to a video display module 104 that displays a video image and an output of the speech processing module 103 is supplied to a speech output module 105 that outputs a speech sound.

A remote control receiver 106 receives an operation signal from a remote control 120. The operation signal is interpreted by a system control module 107 that generally controls the apparatus. The system control module 107 includes an operation control module 107p that controls the operation status of the apparatus according to the result of interpretation of the operation signal.

Further, a detection signal from a sensing module (a camera can be substituted) 108 that detects the presence or absence of a user is input to the system control module 107.

As the sensing module 108, various sensors such as a thermoelectric infrared sensor, ultrasonic sensor, transmission-reception infrared LED sensor and passive infrared sensor or a combination of the above sensors can be used. Alternatively, as an alternative of the sensor, a camera that photographs an area to detect a user (by detecting a human body, face or the like in the photographing area) can be used.

The control module 107 of the apparatus has the following characteristic functions. That is, the main body of the electronic apparatus is selectively set into a status in which the power saving status is released or a power saving status according to the presence or absence of an object (user) from the sensing module. Then, if an operation signal is input even when the sensing module cannot detect the object in the power saving status, the power saving status is forcibly released.

More specifically, the apparatus includes a power saving status setting module 107a that sets the main body of the electronic apparatus into a power saving status by detecting the absence of the object, a first power saving status releasing module 107b that releases the power saving status of the electronic apparatus main body into a power saving status by detecting the presence of the object and a second power saving status releasing module 107c that forcibly releases the power saving status when an operation signal is input from a remote control even in a case where the sensing module cannot detect an object in the power saving status. A power saving control module can be used to give a general term for the power saving status setting module 107a, first power saving status releasing module 107b and second power saving status releasing module 107c.

Figure 3:
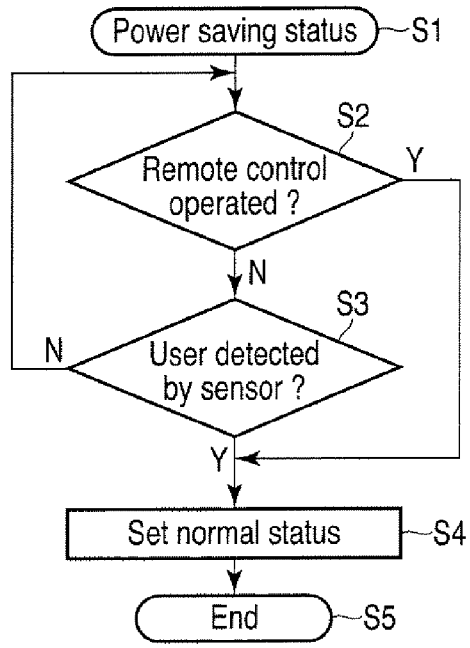
FIG. 3 is a flowchart for illustrating an example of the operation of the device of FIG. 2.

FIG. 3 shows one example of an operation flow of the above apparatus. It is now assumed that the absence of a user as an object is detected by the sensing module 108 and the operation is set in a power saving status (step S1). In this status, the process for detecting the presence or absence of the user by the sensing module 108 is arbitrarily or periodically performed (steps S2, S3).

If the user is detected by the sensing module 108, that is, when a preset detection signal is acquired, the normal operation is performed (shifting from step S3 to step S4). If the user is not detected, the power saving operation is continuously performed. However, if an operation signal from the remote control 120 is received in a status in which the user is not detected by the sensing module 108 (step S2), the normal operation is performed (shifting from step S3 to step S4) irrespective of the remote control operation. In this case, it is possible to perform the normal operation or continuously perform the power saving operation when the operation of the "return button" or the operation of the "decision button" by the user is recognized after a message of "release interruption of video display in power saving status and shift to normal operation status" is displayed before the normal operation is performed. The message is issued based on the control operation of the power saving status setting module 107a. This function is effective when the user temporarily passes through the detection area or when a pet or the like enters the detection area and the present will of the user can be reflected on the operation.

By utilizing this invention, the erroneous operation due to misunderstanding of the user can be prevented and the degree of convenience for the user can be enhanced in the video display apparatus that detects the absence of the user. For example, when a first user stops viewing and goes outside the detection area A1 (for example, outside the living room) and the video display apparatus is set in the power saving status and if a second user comes into the living room, he tends to misunderstand that the power source of the video display apparatus set in the power saving status is turned off.

At this time, the second user may operate the power source switch from outside the detection area A1. In such a case, a video display apparatus to which this invention is not applied is substantially set into a power-off status and is thus set into a status different from the intention (power on) of the second user. Then, the user may have a doubt about the function of the apparatus.

However, in this invention, since the second power saving status releasing module 107c is provided, the video display apparatus can perform the normal operation irrespective of the remote control operation due to erroneous recognition by the second user.

This invention is not limited to the above embodiment. In the above embodiment, an example in which this invention is applied to the video display apparatus 100 is explained. Further, in the video display apparatus, an output to the display module in the power saving status is interrupted. However, this invention is not limited to this case. An output of the video display apparatus to the display module is interrupted in the power saving status, but an output of the speech output module may be kept supplied. Further, in the video display apparatus, an output to the display module in the power saving status may be interrupted and an output of the speech output module may also be interrupted.

This invention becomes particularly effective in an environment in which the remote control operation can be performed from outside the detection area A1 of the sensing module 108. This means that the detection area A1 of the sensing module 108 can be narrowed.

Figure 4:
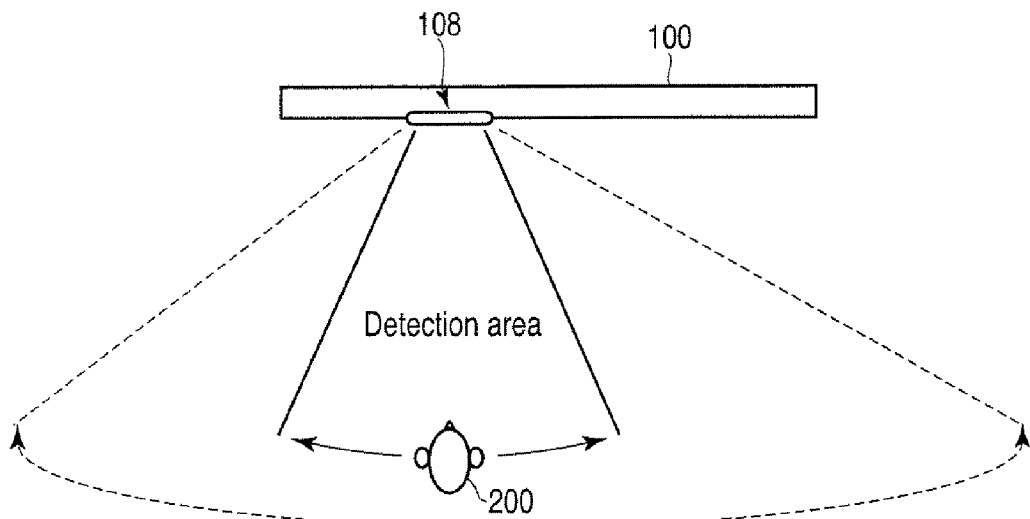
FIG. 4 is an explanatory view showing a detection area, for illustrating the effect of this invention.

That is, by narrowing the detection area to change the detection area from a detection area X to a detection area Y as shown in FIG. 4, an unnecessary erroneous operation can be prevented and power consumption can be saved. In other words, if the detection area is excessively large, the apparatus may detect a pet or the like in the power saving status and repeatedly perform unnecessary on/off operations. In order to reduce the number of unnecessary on/off operations, it is preferable to narrow the detection area. Therefore, the detection area is set from the detection area X to the detection area Y. However, if the detection area is thus narrowed, the erroneous recognition by the user as described before may occur in the power saving status. Therefore, the misunderstanding of the user can be prevented by releasing the power saving status irrespective of the content of the remote control operation when the power saving status is set as in this invention.

Further, this invention can also be applied to an audio equipment, air conditioner, room lighting apparatus or the like. In the air conditioner and room lighting apparatus, an operation signal is not always output from the remote control. For example, it is operated by means of a switch (fixed operating module) in a monitor room. Therefore, in the apparatus of this invention, an operation signal generator is not limited to the remote control.

Figure 5:
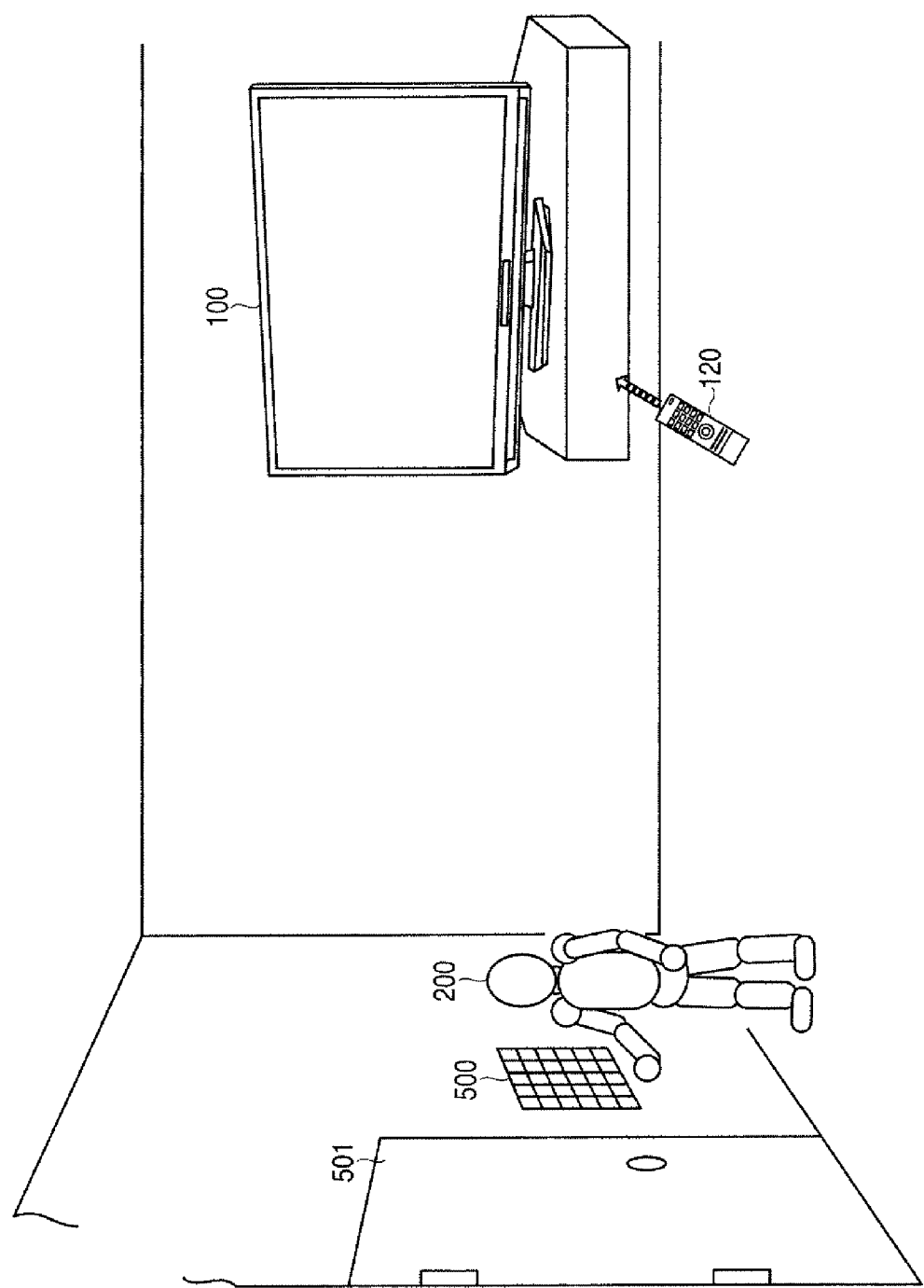
FIG. 5 is a conceptual view of another usage status of the video display apparatus to which this invention is applied.

FIG. 5 shows an example in which an operation signal generator 500 is set near a door 501 of a room, for example. In this case, the user 200 misunderstands that the power source is turned off when he enters the room while the video display apparatus 100 is being set in the power saving status. Even in such a case, a mechanism is constructed to forcibly release the power saving status if the operation signal is generated and thus the high reliability of the apparatus can be attained.

In this invention, power consumption can be saved by applying this invention to various types of electronic apparatuses such as a video display apparatus, room air conditioner and the like.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus which changes a power supply state according to a power operation signal from a remote controller, comprising:
    a sensor configured to detect a specific object within an area;
    a remote control receiver configured to receive the power operation signal, even if the remote controller is outside the area where the sensor is able to detect the specific object;
    a power saving status setting module configured to set the electronic apparatus into a power saving status when the sensor is unable to detect the specific object in the area;
    a first power saving state-releasing module configured to release the power saving status of the electronic apparatus when the sensor has detected the specific object in the area; and
    a second power saving status-releasing module configured to release the power saving status without powering off the electronic apparatus when the power operation has been performed while the electronic apparatus is in the power saving status and the specific object remains undetected by the sensor.

2. The electronic apparatus according to claim 1, wherein the electronic apparatus is a video display apparatus whose output to the display module is interrupted in the power saving status.

3. The electronic apparatus according to claim 1, wherein the electronic apparatus is a video display apparatus whose output to the display module is interrupted in the power saving status and an output of a speech output module is maintained.

4. The electronic apparatus according to claim 1, wherein the electronic apparatus is one of an audio equipment, air conditioner and room lighting apparatus.

5. A control method of an electronic apparatus that changes a power supply state according to a power operation signal from a remote controller, and includes a sensor configured to detect a specific object in a prescribed area, and a remote control receiver configured to receive the power operation signal, the method comprising:
    setting the remote control receiver into a receiving state of the power operation signal, the receiving state being a state where the remote control receiver can receive the power operation signal even if the remote controller is outside the prescribed area where the sensor is able to detect the specific object;
    setting the electronic apparatus into a power saving status when the sensor is unable to detect the specific object in the prescribed area;
    releasing the power saving status of the electronic apparatus when the sensor has detected the specific object in the prescribed area; and
    releasing the power saving status without powering off the electronic apparatus when the power operation has been performed while the electronic apparatus is in the power saving status and the specific object remains undetected by the sensor.

6. The electronic apparatus of claim 1, wherein the power saving status setting module configured to set the electronic apparatus into the power saving status when the sensor is unable to detect the specific object in the area after a predetermined time period has elapsed.

7. The method of claim 5, wherein the setting of the electronic apparatus into the power saving status occurs if the sensor is unable to detect the specific object in the prescribed area after a predetermined period of time has elapsed.

8. A control method of an electronic apparatus that changes a power supply state according to a power operation signal from a remote controller, and includes a sensor configured to detect a specific object in a prescribed area, and a remote control receiver configured to receive the power operation signal, the method comprising:
    setting a remote control receiver within an electronic apparatus into a receiving state of the power operation signal, the receiving state being a state where the remote control receiver can receive a power operation signal from a remote controller even if the remote controller is outside an area monitored by the sensor;
    setting the electronic apparatus into a power saving status based upon the sensor failing to detect a viewer within the area;
    releasing the power saving status of the electronic apparatus when the sensor has detected the viewer within the area; and
    releasing the power saving status without powering off the electronic apparatus when the power operation has been performed while the electronic apparatus is in the power saving status and the sensor fails to detect the viewer within the area.

* * * * *